United States Patent
Que

(10) Patent No.: US 10,352,462 B2
(45) Date of Patent: Jul. 16, 2019

(54) PRESSURE BALANCED PORTS FOR HYDRAULIC VALVES

(71) Applicant: BorgWarner Inc., Auburn Hills, MI (US)

(72) Inventor: Dennis R. Que, Northville, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 14/767,074

(22) PCT Filed: Feb. 10, 2014

(86) PCT No.: PCT/US2014/015478
§ 371 (c)(1),
(2) Date: Aug. 11, 2015

(87) PCT Pub. No.: WO2014/130274
PCT Pub. Date: Aug. 28, 2014

(65) Prior Publication Data
US 2015/0377369 A1    Dec. 31, 2015

Related U.S. Application Data

(60) Provisional application No. 61/766,296, filed on Feb. 19, 2013.

(51) Int. Cl.
*F16K 11/07* (2006.01)

(52) U.S. Cl.
CPC .......... *F16K 11/07* (2013.01); *F16K 11/0708* (2013.01)

(58) Field of Classification Search
CPC .... F16K 11/07; F16K 11/0708; F16K 27/041; F15B 13/0402
USPC .......................... 137/625.69, 625.67, 625.68
See application file for complete search history.

(56) References Cited

U.S. PATENT DOCUMENTS

| 4,131,055 | A | * | 12/1978 | Erwin | B60T 13/12 137/625.68 |
| 6,254,061 | B1 | * | 7/2001 | Levine | A61B 1/00135 251/322 |
| 6,435,213 | B2 | | 8/2002 | Lou | |
| 7,950,416 | B2 | * | 5/2011 | Nakai | F16H 61/0251 137/625.65 |
| 2001/0022196 | A1 | | 9/2001 | Fagerstrom | |
| 2003/0084945 | A1 | * | 5/2003 | Chiu | E03C 1/04 137/625.48 |
| 2012/0048410 | A1 | | 3/2012 | Shimaski | |

FOREIGN PATENT DOCUMENTS

| EP | 0247336 A2 | 12/1987 |
| JP | 06-002773 A | 1/1994 |
| JP | 2011256893 A | 12/2011 |

OTHER PUBLICATIONS

International Search Report and Written Opinion for International Application No. PCT/US2014/015478 dated May 1, 2014.

* cited by examiner

*Primary Examiner* — Michael R Reid
*Assistant Examiner* — Paul J Gray
(74) *Attorney, Agent, or Firm* — Warn Partners, P.C.

(57) ABSTRACT

A valving arrangement is provided with a specially designed second fluid port which equalizes lateral forces induced upon a spool valve to greatly reduce or eliminate such forces and thereby virtually eliminate laterally induced ware upon the spool valve or a valve port.

4 Claims, 5 Drawing Sheets

PRESSURE BALANCED PORTS FOR HYDRAULIC VALVES

FIELD OF THE INVENTION

The present invention relates to valve arrangements, especially valve arrangements utilized in electronically controlled vehicle automatic transmissions.

BACKGROUND OF THE INVENTION

Until the late 1940's and early 1950's, virtually all automotive vehicles were provided with manually controlled transmissions. In the late 1940's and early 1950's, automatic transmissions were brought forth which utilize hydraulic logic controlled clutches and synchronizers along with a torque convertor to automatically make the gearing shifts needed when operating the vehicle. In the 1980's, many automotive transmissions were converted to being electronically controlled rather relying upon hydraulic logic controlled valves to operate the transmission to thereby provide more optimum shift points to increase vehicle mileage. With the utilization of electronic control, much of the hydraulic mechanisms controlling the transmission are operated by solenoid actuated valves. The solenoid actuated valves typically control a spool valve mounted within a valve body. The spool valve is manipulated in many applications to connect a control pressure (a port connected with a clutch or synchronizer) with a supply pressure (a port connected with a pump) or with an exhaust pressure (a port connected with a sump). Many of the solenoid valves utilized in a transmission are mounted within a common valve body. The valve body is typically a multi-passage member providing passages to and from the hydraulic supply, control and exhaust ports of a number of spool valves and solenoid valves for the control of various clutches, synchronizers or other hydraulic functions of the transmission.

Referring to FIGS. 1, 2 and 3 a prior art valve arrangement 17 is shown. In the prior art valve arrangement 17, there is a spool valve 19 with metering cylindrical block valve head lands 27 and 14 operating within a first portion 41 of a valve body. The valve lands 27 and 14 are joined by a valve groove or stem 13 The valve body first portion 41 has a generally cylindrical hole 43 that provides a metering orifice between a first supply port opening 23 and a second control port opening 21. To connect a first supply port opening 23 with a second control port opening 21, the spool valve 19 is moved in a direction that the metering land 27 passes out of the cylindrical hole 43 and thereby enters the second control port opening 21, allowing hydraulic communication from said first supply port opening 23 to said second control port. Fluid initially enters the second control port opening 21 at two shaped control edges 39 oriented 180 degrees from each other. As the metering land 27 enters further into the second control port opening 21, eventually, fluid may enter along the full 360 degree perimeter of the metering land 27. Fluid flowing into the second control port opening 21, exits the control port at an outlet end 35 of the second control port opening 21. In the port opening geometry of prior art, the fluid metering 180 degrees opposite of the outlet end 35 (towards the semi-circular blind end 31) must flow all the way around the valve while fluid metering directly in front of the outlet end 35 has an unimpeded exit flow. The result is that at high metering flows, pressure can build up 180 degrees from the outlet end 35 creating and unbalance pressure profile around the valve. Although functionally the above noted design is sufficient, the pressure imbalances can impart lateral forces on the spool valve 19 which may lead to excessive friction and wear between the spool valve 19 and valve body first position 41. It is desirable to provide a valve arrangement wherein these lateral induced forces are minimized and therefore reduce or eliminate any laterally induced force wear upon the valving arrangement.

SUMMARY OF THE INVENTION

To make manifest the above noted and other desires, a revelation of the present invention is brought forth. In a preferred embodiment, the present invention provides a valving arrangement with a specially designed second fluid port opening which equalizes the lateral forces induced upon the spool valve to greatly reduce or eliminate such forces and thereby virtually eliminate this laterally enforced induced wear upon the spool valve or the valve port.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6A also shows in phantom a plate (shown in FIG. 5) that covers over the second port opening. The plate has two openings;

In FIG. 6B the plate of FIGS. 5 and 6A is removed;

DETAILED DESCRIPTION OF THE PREFERRED EMBODIMENTS

The following description of the preferred embodiment(s) is merely exemplary in nature and is in no way intended to limit the invention, its application, or uses.

Figure 1:
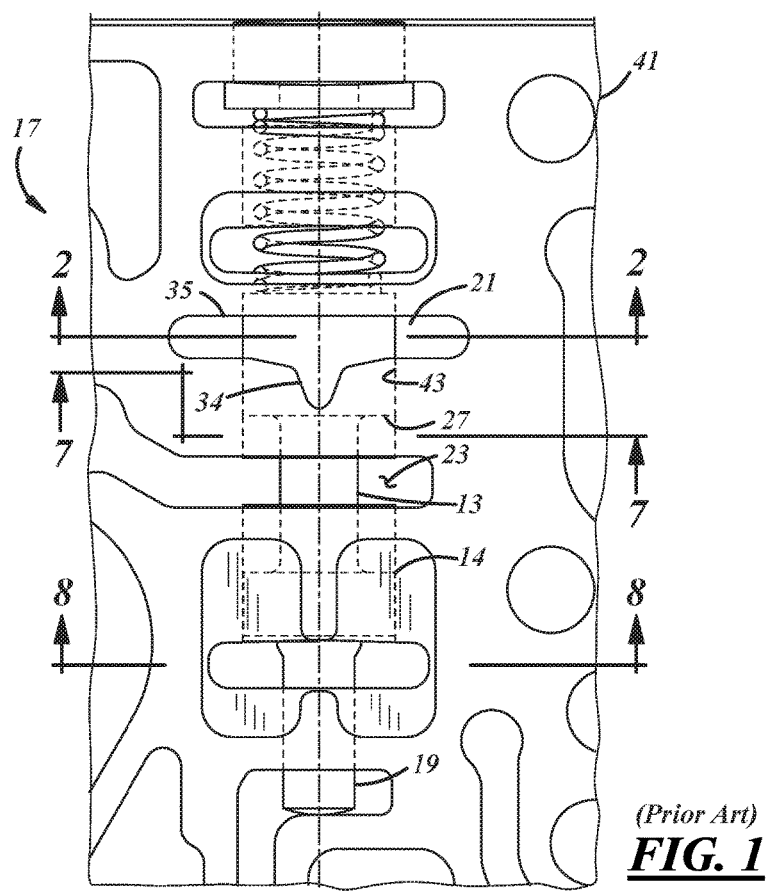
FIG. 1 is a top plan view of a first portion of a valve body with a valving arrangement prior to the present invention with a covering plate being removed for clarity of illustration.
Figure 2:
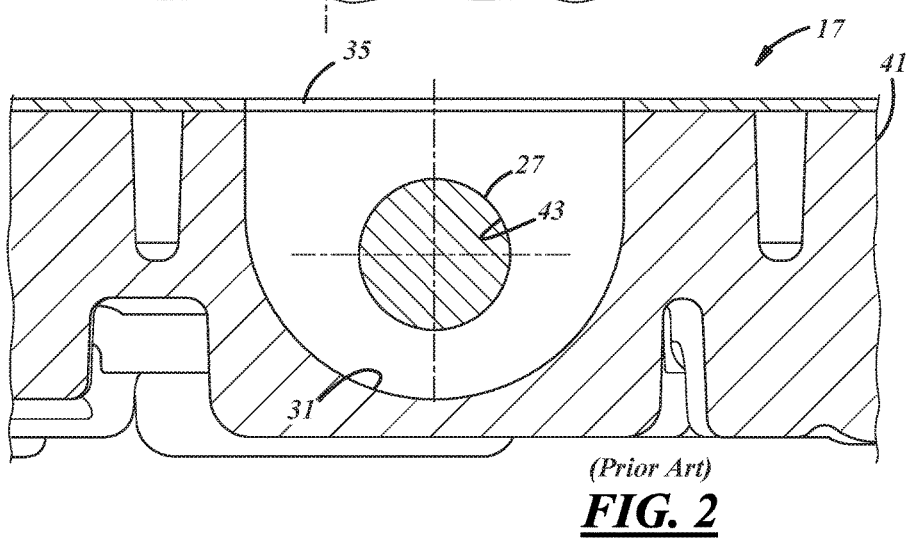
FIG. 2 is a sectional view taken along lines 2-2 of FIG. 1.
Figure 3:
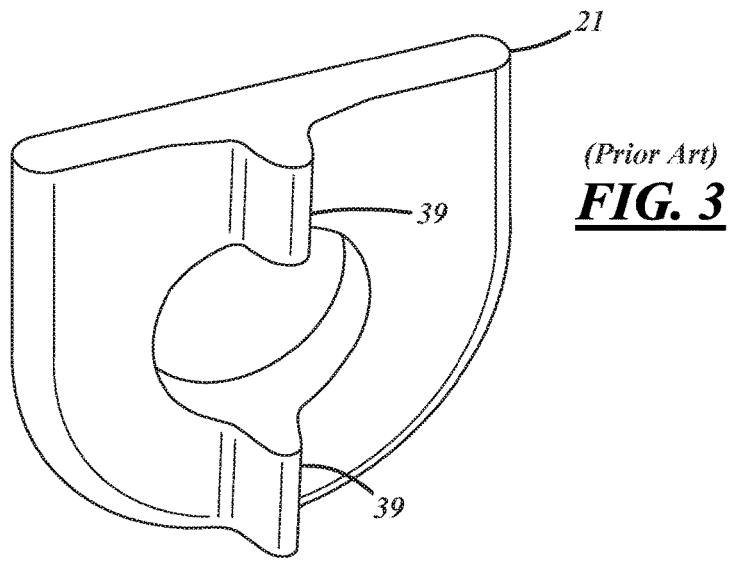
FIG. 3 is a perspective view of a spatial representation of a second port opening in the valve body shown in FIG. 1, the special opening being shown in solid and with an area that a spool valve landing projects through being shown as a cut out for clarity of illustration.
Figure 4:
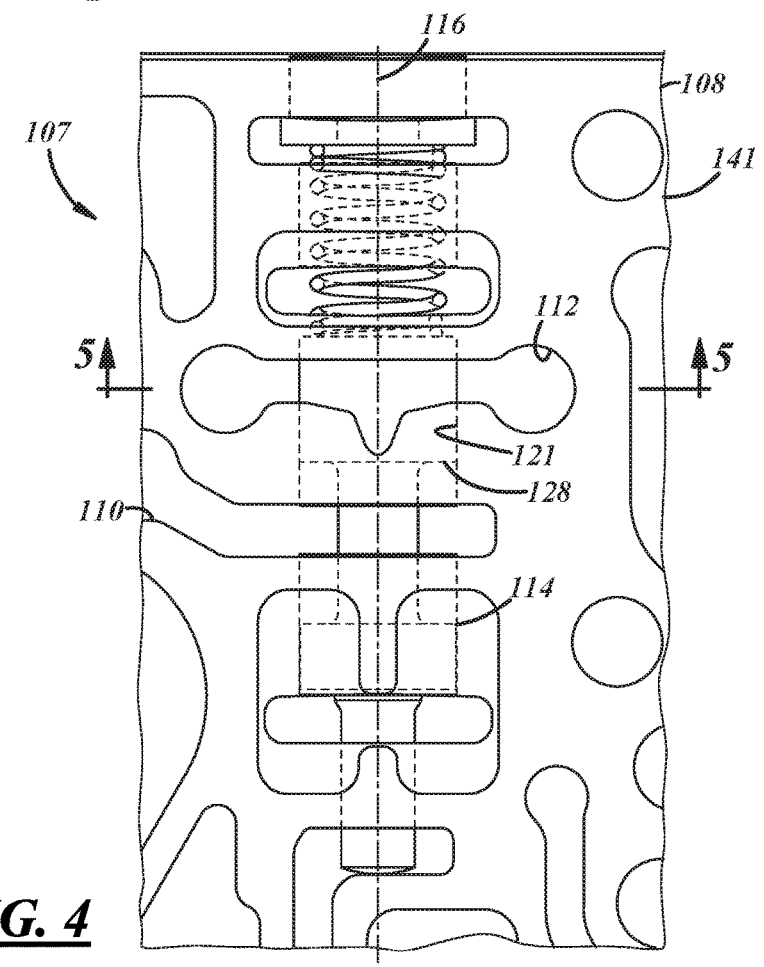
FIG. 4 is a first portion of a valve body according to the present invention with a covering plate being removed for clarity of illustration.
Figure 5:
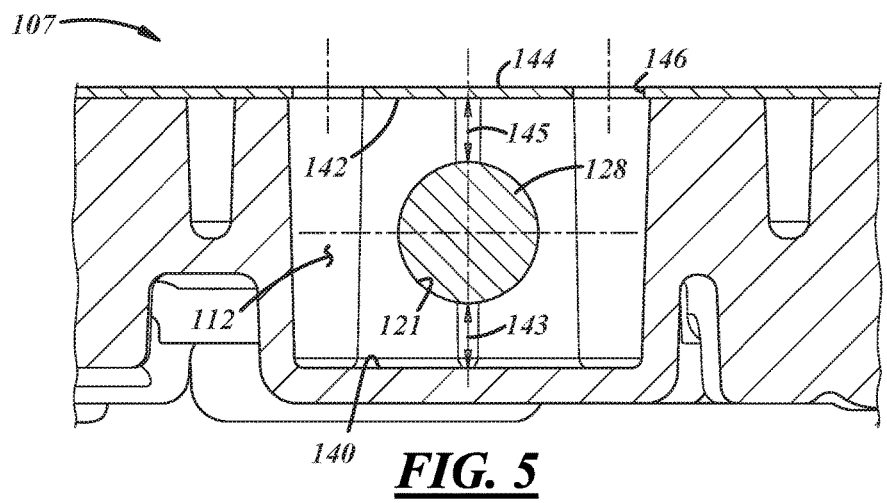
FIG. 5 is a sectional view taken along line 5-5 of FIG. 4.
Figure 6A:
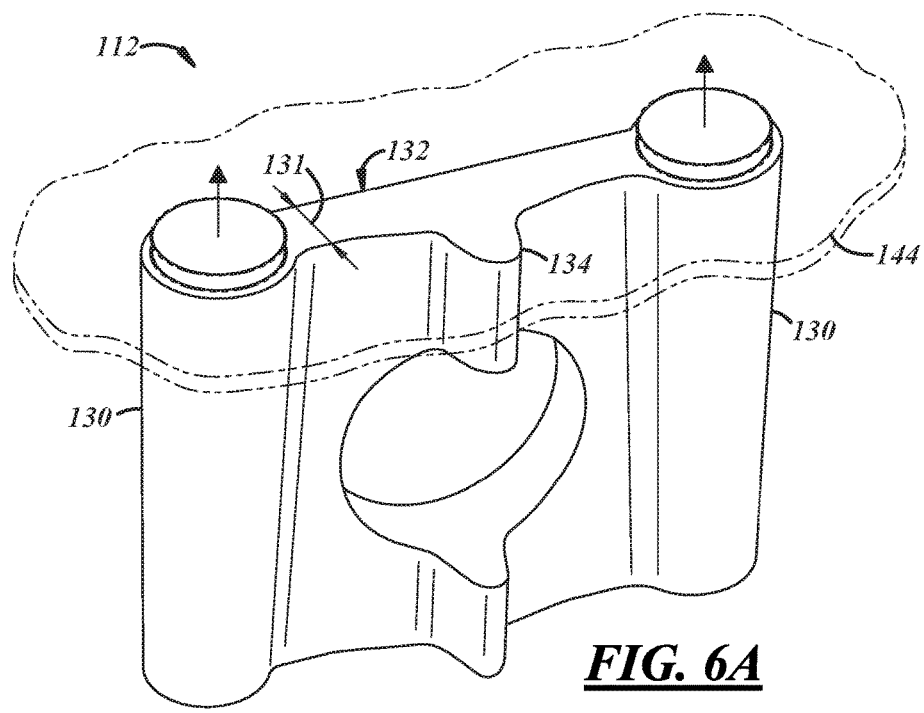
FIG. 6A is a perspective view of a second port opening according to the valving arrangement shown in the valve body of FIG. 4, the spatial opening with an area that a spool valve landing projects through being shown as a cut out for clarity of illustration.
Figure 6B:
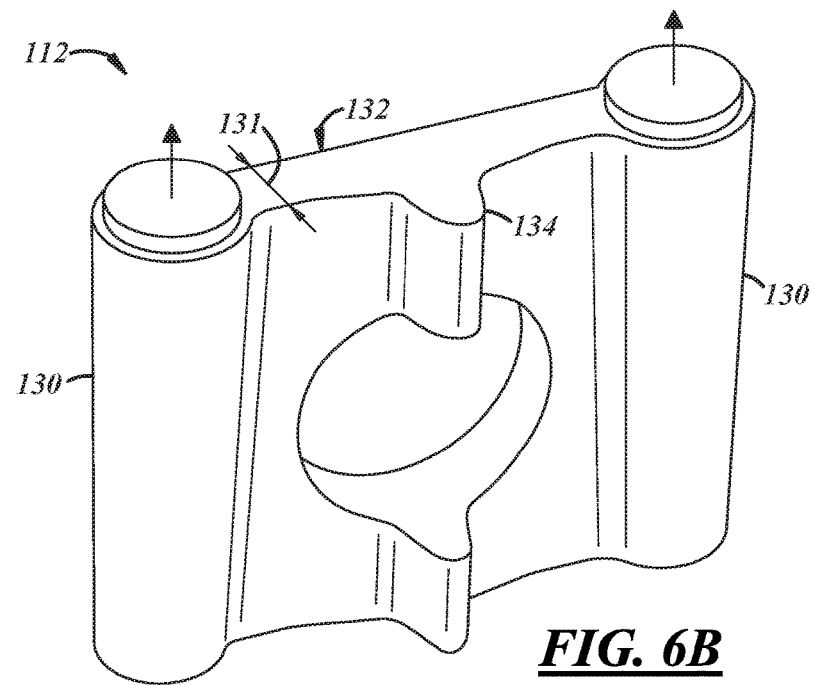
FIG. 6B is a perspective view of the second port opening of FIG. 6A shown in solid for clarity of illustration.
Figure 7:
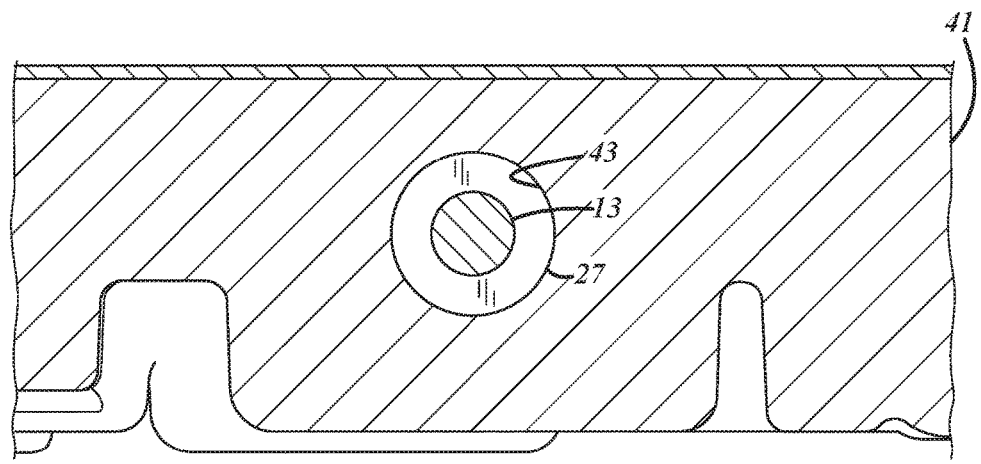
FIG. 7 is a sectional view taken along lines 7-7 of FIG. 1.
Figure 8:
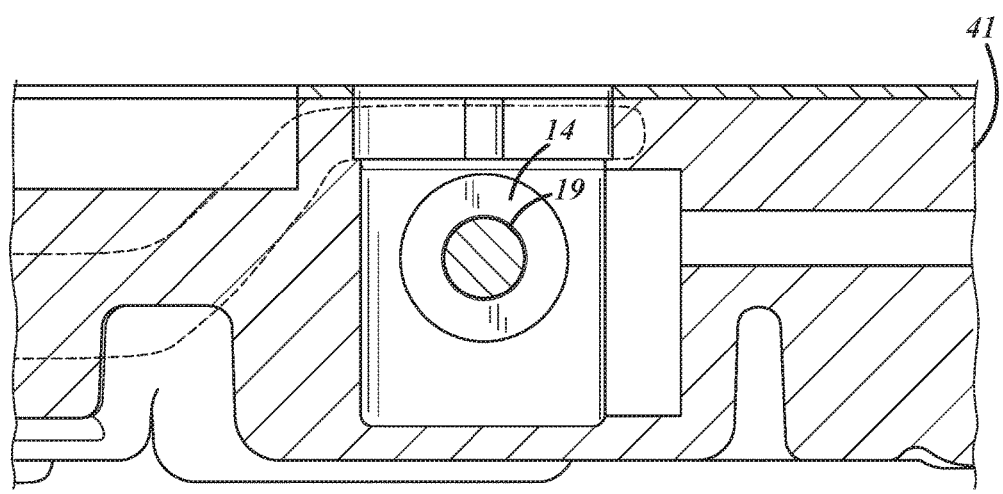
FIG. 8 is a sectional view taken along lines 8-8 of FIG. 1.

Referring to FIGS. 4, 5 and 6, a valving arrangement 107 according to the present invention is provided. FIG. 4 illustrates a sector of a first portion 141 of a valve body 108. Valve body 108 is substantially larger than that shown having a plurality of spool valves mounted therein for controlling a plurality of clutches, synchronizers and other functions of the transmission. However, the present invention is shown in just one segment of the valve body 108. The valve body 108 has a first fluid three dimensional port opening 110. Typically, the port opening 110 is fluidly connected with a source of pressurized hydraulic fluid to be metered out to a control pressure or is a control pressure to be metered out to an exhaust pressure. The valve body 108 has a second fluid three dimensional port opening 112. The boundaries of the second fluid port opening are formed by the first portion of the valve body. The valve body 108 mounts a spool valve 114. The spool valve 114 is axially movable along a first axis 116. The spool valve 114 has a metering land 128 for metering fluid between the first fluid port opening 110 and the second fluid port opening 112 through a cylindrical hole 121. To connect a first fluid port opening 110 with a second control port opening 112, the spool valve 114 is moved in a direction that the metering land 128 enters the second fluid port opening gradually opening hydraulic communication from said first fluid port opening to said second fluid port opening. Fluid initially enters the second fluid port opening 112 at two shaped control edges 134 oriented 180 degrees from each other. As the metering land 128 enters further into the second fluid port opening 112, eventually, fluid may enter along the full 360 degree perimeter of the metering land 128.

FIG. 6 is an enlargement of the spatial second fluid port opening 112, formed by the first portion of the valve body. The second fluid port has two symmetrically spaced longitudinal flow plenums 130. The plenums extend generally in a plane perpendicular to the first axis 116 of the spool valve. The plenums 130 are transversely connected by an elongated transverse flow chamber 132, formed in the first portion of the valve body. The plenums are lateral of and laterally separated from one another by the land 128 of the valve spool. The transverse flow chamber 132 has a dimension 131 along the first axis which is typically less than the diameter of the plenums 130. The transverse flow chamber 132 is connected with a generally symmetrical metering flow notch 134. The plenums 130 extend significantly beyond the cylindrical hole 121 to a second fluid port opening blind end 180.

The second port has a throttled end 142. A distance 143 from the blind end 140 to the generally cylindrical port 121 is generally equal to or slightly greater than a distance 145 from the port 121 to the throttled end 142. A covering plate 144 forms most of the throttled end having outlets 146 with a slightly smaller diameter than that of the plenums 130. The plate 144 causes all the fluid (within the second fluid port opening 112) to exit out of the plenums 130 from the second port in a common direction intersecting a common plane defined by the plate. The plenums 130 are sized to be substantially unrestrictive to flow and therefore even at extreme flow rates, the pressure drop from one end of the plenum to the other is minimal. Because of the presence of the plate outlets 146, fluid metering at any angular orientation of the metering edge of the land 128 must flow transversely to the plenums 130.

With the inventive valving arrangement shown, pressure in the second fluid port opening 112 is much more balanced around the spool valve 114 as it slides within the valve body 108 and therefore excessive friction and wear is greatly diminished or eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valving arrangement including a valve body having a first portion covered by a plate, said valve body first portion mounting a spool valve with a land, said spool valve land being movable along a first axis to fluidly connect a first fluid port three dimensional opening of said valve body with a second fluid port three dimensional opening of said valve body first portion through a cylindrical hole in said valve body first portion connecting said first fluid port opening and said second fluid port opening, said valve body second fluid port opening having a shape, with boundaries formed by said valve body first portion, including:

symmetrically spaced longitudinal flow plenums extending in a first common plane perpendicular to said first axis, said plenums being lateral of said valve spool land and laterally separated from one another by said valve spool land, said plenums having a larger dimension along said first axis than a transverse flow chamber, said plenums extending beyond said cylindrical hole to a blind end of said second fluid port opening, said plenums being transversely joined by said transverse flow chamber, and wherein said plate covers said transverse flow chamber about a throttled end of said second fluid port opening and provides an opening for each of said plenums; and wherein said fluid in said plenums exits said valve body through said opening in said plate in a direction intersecting a plane formed by said plate.

2. A valving arrangement as described in claim 1 wherein a distance from said cylindrical hole to said second fluid port opening blind end is equal or greater than a distance from said cylindrical hole to said second fluid port opening throttled end.

3. A valving arrangement as described in claim 1 wherein said plate throttles said plenums.

4. A valving arrangement including a valve body having a first portion covered by a plate, said valve body first portion mounting a metered out land of a spool valve with a generally cylindrical block valve head, said spool valve being movable along a first axis to fluidly connect a first valve body fluid three dimensional port opening with a second valve body fluid three dimensional port opening through a cylindrical hole in said valve body first portion connecting said first fluid port opening and said second fluid port opening, said valve body second fluid port opening having a shape with boundaries formed by said valve body first portion, including:

symmetrically spaced apart circular cross-sectional tubular spatial plenums extending in a first common plane perpendicular to said first axis, said plenums beings lateral of said valve spool land and laterally separated from one another by said spool land, said plenums being transversely joined by an elongated transverse flow chamber having a dimension along said first axis less than the diameter of said plenums, said plenums extending beyond said cylindrical hole to a blind end of said second fluid port opening, said transverse flow chamber being connected with generally symmetrical flow notches, said second fluid port opening having an end throttled by said plate with outlets for said plenums and wherein a distance from said blind end of said second fluid port to said cylindrical hole is equal or greater to a distance from said cylindrical hole to said plate and where said plenums are reduced to a smaller diameter by said outlets; and wherein said fluid in said plenums exits said valve body through said plate outlets in a direction intersecting a plane formed by said plate.

* * * * *